United States Patent [19]
Fink et al.

[11] Patent Number: 4,751,141
[45] Date of Patent: Jun. 14, 1988

[54] PROCESS FOR THE MANUFACTURE AND USE OF A POLYPROPYLENE FOIL WITH IMPROVED ADHESION

[75] Inventors: Roland Fink, Pullach; Heinrich Heitz, Germering, both of Fed. Rep. of Germany

[73] Assignee: Alkor GmbH Kunststoffverkauf, Munich, Fed. Rep. of Germany

[21] Appl. No.: 469,495

[22] Filed: Feb. 24, 1983

Related U.S. Application Data

[63] Continuation of Ser. No. 223,967, Jan. 12, 1981, abandoned.

[51] Int. Cl.$^{4}$ .............................................. B32B 27/00

[52] U.S. Cl. ....................................... 428/326; 264/22; 427/39; 427/44; 428/324; 428/500; 428/509; 428/523

[58] Field of Search ............... 428/326, 507, 508, 324, 428/500, 509, 513, 523; 524/35–46, 583, 585, 587; 427/39, 44; 264/22

[56] References Cited

U.S. PATENT DOCUMENTS

| | | | |
|---|---|---|---|
| 3,275,580 | 9/1966 | Battista | 428/326 |
| 3,703,569 | 11/1972 | Wolkowicz | 264/22 |
| 3,888,810 | 6/1975 | Shinomura | 260/17.4 CL |
| 3,900,538 | 8/1975 | Kawakami et al. | 264/22 |
| 4,262,051 | 4/1981 | Welz et al. | 428/324 |

*Primary Examiner*—Paul J. Thibodeau
*Attorney, Agent, or Firm*—Felfe & Lynch

[57] ABSTRACT

A polypropylene foil with a content of fine particles of cellulose acquires substantially improved adhesion properties through surface activation, for example, radiation.

15 Claims, No Drawings

PROCESS FOR THE MANUFACTURE AND USE OF A POLYPROPYLENE FOIL WITH IMPROVED ADHESION

This is a continuation application of Ser. No. 223,967 filed Jan. 12, 1981, now abandoned.

BACKGROUND OF THE INVENTION

This present invention relates to a process for the manufacture and use of a polypropylene film (PP film) with improved adhesion properties.

For many areas of use, the properties of materials must be improved by treating the surface, for example, by lacquering it or coating it with thin finishing films. At the present time, PVC and special papers are chiefly used for improving the surface of materials, especially of metallic, wooden, and cellulose materials.

In using films in various areas of surface improvement, one should proceed from the fact that the coating should take place on carrier materials and other films at temeratures that are frequently above 100° C., and cooling the laminates in the roller coating mills and presses is not economically practical. A higher resistance to heat in retaining shape is also necessary in coating with reaction adhesives which, because of the required stability in storage, should properly react only above 80° C. It is also required in coating with polymer films, that no delamination is to take place in the range of the working temperature.

As far as the physical properties of PP and its copolymerizates are concerned, especially resistance to heat in retaining shape, as well as its environmental safety, PP would by very suitable for improving surface. A decisive disadvantage, however, are the surface energy materials characteristics of PP, which prevent sufficiently good, permanent adhesion of suitable lacquers, adhesives, and polymer films.

The basis of the present invention is to improved the adhesion properties of PP Films by permanently raising the surface energy materials characteristics in such a way that suitable printing, lacquering, and adhesion become possible in a permanent manner.

Processes for the improvement of the adhesion properties of films, especially PP films, are well known. The Corona treatment is an example of this; cf. *Adhasion, Vol.* 12 (1979) pp. 381–389. This treatment, to be sure, temporarily increases surface tension; however, the effect decreases during storage and with higher temperatures.

Another process consists of the flame treatment of films. Here the same disadvantages prevail as in the Corona treatment. Chemical treatment with ozone, fluorine, chlorine, etc. is also well known. The problematic use, particularly, is disadvantageous here, because of the chemical reactivity of these agents. Another process consists of radiation with energized rays, such as, electron rays, UV rays, laser beams, and the like. These processes are relatively expensive, usually require the concomitant use of sensitizers, and at the same time, the permanence of the effect varies.

Permanent improvement of surface adhesion can be achieved by chemical grafting with the use of energized rays. This process, however, is too expensive to be suitable for the area of use under consideration.

SUMMARY OF THE INVENTION

In accordance with the invention, a permanent increase in surface tension and adhesion can be obtained with a content of fine particles of cellulose in the PP films combined with the use of well-know pretreatment methods for PP which pretreatment methods otherwise produce no permanent effect.

The present invention is based on the surprising determination that a content of fine particles of cellulose in the PP improves the effectiveness and the permanence of the surface treatment. The effect can even be increase if the cellulose is added in a PP batch. The concomitant use of mineral fillers produces another favorable effect.

DETAILED DESCRIPTION OF THE INVENTION

Within the frame work of the present invention, fine particles of cellulose, prepared according to the sulfite or sulfate process, which is preferred, as well as native or regenerated cellulose are suitable.

It is expedient for the quantity of cellulose to be between 3 and 50 percent by weight, referred to the sum of PP and cellulose. If a content of 50% by weight is exceeded, the resistance properties are impaired too much.

With a cellulose content under 3%, the improvement in surface-activation obtained is not pronounced enough. It is preferable for the foil to contain 3 to 30 percent by weight of cellulose.

It is expedient that the degree of fineness of the cellulose in the foil according to the present invention be between 1 and 100 $\mu$m with a fiber thickness of 10 to 30 $\mu$m. A finer degree of division is too expensive; with larger particles, there are problems in the manufacture of smooth, thin films. With native and reclaimed cellulose, however, even particles of up to 100 $\mu$m in thickness and a maximum average lenght of 200 $\mu$m can be used, without the occurrence of fundamental difficulties with respect to the formation of the film.

The commercial qualities, including copolymers with $\alpha$-olefins and graft coplymers with vinyl compounds are suitable as PP within the framework of the present invention. Random and block copolymers with 1 to 10 mol % ethylene of mixtures with polyethylene (PE), particularly with 5 to 20% PE, which have a resistance to heat VSP/A over 100° C., are preferred.

The film according to the present invention may, in addition, also contain mineral fillers. Such fillers for polymer films are well known. Mica, talc, silicates, and silicic acids in their various forms are especially suitable and, therefore, preferred, Examples of other useful mineral fillers are carbonates, particularly calcium carbonates, such as limestone and chalk, as well as magnesium carbonates and the like.

Such properties as the Vicat point, Shore hardness, adhesiveness, and tensile strength can be influenced by the addition of suitable mineral fillers. If such mineral fillers are present, it is convenient for the film to contain 3 to 30% by weight, preferably 3 to 20% by weight, referred to the sum of polyolefin and cellulose.

The film may, besides, contain one or several more organic modifying agents. These serve to regulate viscosity, calendrability, extrusility, and similar properties. A preferred group for this purpose are block polymers of styrene with butadiene or isobutylene or isoprene. Other suitable modifying agents are polymerisates based on styrene-butadiene, methacrylate-butadiene-styrene. Polyolefins that contain functional groups are particularly suitable for influencing special physical properties and adhesiveness. It is convenient for such modifying additives to be present in an amount of 0.5 to 20% by weight, preferbly 2 to 10% by weight, referred, in each case, to the sum of polyolefin and cellulose.

The use of wood powder in place of cellulose is not expedient for the intended areas of use, mainly because of its intrinsic color, insufficient purity, lack of stability in light, and change in color under the influence of temperature. Besides, no comparable adhesive effect is achieved.

The experimental results reproduced in Table 1 show the increase in surface tension and in its permanence as result of Corona treatment as a function of the cellulose component. In the manufacture of the films investigated, the cellulose was added by means of an HD-PE master batch 1:1 (HD-PE Hostalen GC7260).

TABLE 1

| Part by weight of cellulose[1] in PP | Surface tension in dyn/cm | | | | |
|---|---|---|---|---|---|
| | untreated | Corona treatment after | | | |
| | | 1 hr | 3 days | 3 weeks | 3 months |
| 0 | 25 | 46 | 38 | 28 | — |
| 5 | 25 | 52 | 50 | 50 | 45 |
| 20 | 25 | 58 | 52 | 52 | 52 |

[1]PP Hostalen PPN 1060

Since, with PP, higher surface tension does not alsways simultaneously produce greater adhesion (see *Adhesion,* Vol. 12 (1979), pp. 381–389), the adhesion properties were tested by means of a urea-formaldehyde adhesive that is familiar to the trade. In so doing, the film samples were manufactured under the same conditions, subjected to Corona treatment, and compressed for 10 seconds at 140° C. at 10 kp/cm$^2$. The permanence of the adhesion was evaluated by storing for one day at 90° C. The results are shown in Table 2.

TABLE 2

| Formula | Surface tension dyn/cm | | Resistance to peeling kp/2.4 cm | |
|---|---|---|---|---|
| | 1 hour 20° C. | 1 day 90° C. | 1 hour 20° C. | 1 day 90° C. |
| PP + 0 parts of cellulose[1] | 48 | 42 | 0.1 | 0 |
| PP + 20 parts of cellulose[1] | 58 | 52 | 1.2 | 1.1 |
| PP[1] + 20 parts of cellulose[2] (PE/cellulose batch) | 58 | 56 | 2.6 | 1.9 |

[1]PP Eltex Kl 100
[2]Batch:
50 parts by weight of HD-PE Eltex 2008
50 parts by weight of cellulose Arbocel B 600/30

These results show that with a content of cellulose the effect not only becomes significantly more permanent, but is also considerably increased, particularly if the cellulose is added as a PE batch.

An additional subject of the present invention is a process for the manufacture of a PP film with improved adhesion by forming the foil according to customary methods and using a surface-activating treatment, which process is characterized in that fine particles of cellulose are added as a filler. It is preferable to add 3 to 50% by weight of cellulose, with 3 to 30% by weight being especially preferred, referred to the sum of polyolefin and cellulose. Cellulose fibers up to a length of 200 μm are suitable, with an average diameter of up to 100 μm.

The above details are valid with respect to the preferred polypropylenes. All the methods of manufacturing films and the technologies of mixing that are customary and that are familiar to those skilled in the art are suitable for the manufacture of the foil.

Mineral fillers and/or modifying agents may also be added in the manufacture of the foil. The above statements on the composition of the film are accordingly valid for this.

Surface activation may be carried out by radiation or by treatment with a flame or ozone. The Corona treatment is particularly preferred; other methods of radiation make use of electron rays, UV rays, or laser beams.

By means of the present invention, as has already been mentioned, the surface adhesion of polypropylene films is substantially increased, and by doing this, the use of such films for coating, printing, lacquering, and pasting is significantly improved or even made possible at all, especially in modern plants, which use short processing times and as high temperatures as possible. In pasting the film according to the present invention with, for example, UF resin, there was no change in the adhesion even after months. The resistance of the surface activation to the influence of temperature is also considerably improved. The adhesions of films according to the present invention, for example, which were coated onto plywood sheets with UF resin, show no variation at coating temperatures between 80° and 140° C. with a pressing period of 30 seconds.

Printing inks, for example, those based on terpolymers of vinyl chloride-vinyl acetate-maleic acid from vinyl polymers containing OH-groups, but also the usual PE printing inks exhibit just as good adhesion as reaction lacquers, for example, based on polyurethane melamine resins, as well as UV hardening polyester epoxide and polyurethane acrylates. Even after 1,000 hour xeno test weathering and in the test under tropical conditions, no change in adhesion could be detected according to ASTM Norm D 2141-63T (grid cutting method).

By the addition of mineral fillers and/or organic modifying agents, the properties of the film may be varied in a broad range, and the advantageous adhesive properties may even, to some extent, be improved. For example, the surface adhesion achieved by Corona treatment of a film consisting of 95 parts of polypropylene and 5 parts of cellulose is advantageously influenced by the addition of 20 or 30 parts of talc.

The usual dyes and pigments do not work out disadvantageously.

The foils according to the present invention may also be bonded directly by fusion adhesion, without an adhesive, to metals, wood, polymers and copolymers with polar groups, and the like, and they show good and permanent adhesion.

Coating is possible even at low temperatures, for example, with epoxy resins and polyurethanes, as well as vinyl acetate copolymers.

The following examples further explain the present invention.

EXAMPLE 1

Polyethylene MfI 190/2=8 g/10 min) density 0.958 (Hostalen GC 7260) and cellulose with a particle size <50 μ (Arbocel B 600/30) are mixed in a ratio of 1:1, homogenized on a calender at 160° C. for 10 minutes, and granulated after cooling.

10 parts by weight of the batch obtained in this way is mixed with 90 parts by weight of PP MfI 190/5=3 (g/10 min) density 0.905 (g/cm$^3$) Hostalen PPN 1060, and extruded as an 80 μm-thick film at 220° C. temperature of the mass.

The extruded film is subjected to Corona treatment. The Corona treatment is carried out on the Demes-VM pretreatment apparatus at full power and a track speed of 5 m/min. The treated film has the following properties:

| | | |
|---|---|---|
| surface tension after | 1 hour | 52 dyn/cm |
| | 3 weeks | 50 dyn/cm |
| | 3 months | 48 dyn/cm |
| not pretreated | 25 to 28 dyn/cm | |
| ability to retain its shape against heat | VSP/A 148° C. | |
| hardness | Shore D 69 | |
| tensile strength (longitudinal) | 30 N/mm$^2$ | |

The treated film was coated on a sheet of plywood customary in the trade.

A UF resin of the following composition is used for applying the adhesive:

100 parts by weight of Aerolite 306

50 parts by weight of hardener W 170

70 parts by weight of water

Pressing conditions:

| | |
|---|---|
| temperature | 140° C. |
| pressure | 10 kp/cm$^2$ |
| time | 10 sec |

The pulling strength in the peeling test is 1.6 kp/2.4 cm

EXAMPLE 2

Comparison

The PP used in Example 1 is mixed, without additional additives, with HD-PE (Hostalen GC 7260) in a proportion of 95:5, extruded under the conditions indicated there, pretreated, and calendered.

| | | |
|---|---|---|
| surface tension after | 1 hour | 48 dyn/cm |
| | 3 weeks | 28 dyn/cm |
| | 3 months | 25 dyn/cm |
| not pretreated | 25 dyn/cm | |
| ability to retain its shape against heat | VSP/A 145° C. | |
| hardness | Shore D 68 | |
| longitudinal tensile strength | 28 N/mm$^2$ | |
| pulling strength in the peeling test | 0.1 kg/2.4 cm | |

EXAMPLE 3

A mixture of 80 parts by weight of a PP copolymer MfI 230/2=1.8 g/10 min, density 0.92 g/cm$^3$ (Eltex K1 100) and 20 parts by weight of cellulose Arbocel (B 600/50) and the usual additives is calendered at 200° C. into a 100 μm-thick film. Pretreatment and pasting take place according to Example 1.

The following values are determined:

| | | |
|---|---|---|
| surface tension after | 1 hour | 58 dyn/cm |
| | 3 weeks | 52 dyn/cm |
| | 3 months | 52 dyn/cm |
| not pretreated | 25 dyn/cm | |
| ability to retain its shape against heat | VSP/A 150° C. | |
| hardness | Shore D 72 | |
| longitudinal tensile strength | 32 N/mm$^2$ | |
| pulling strength in the peeling test | 1.3 kp/2.4 cm | |

EXAMPLE 4

A mixture of 80 parts by weight of PP according to Example 3 and 40 parts by weight of a batch of 20 parts of cellulose (Arbocel BO 600/50) and 20 parts of HD-PE MfI 190/5=1 (g/10 min) density 0.950 g/cm$^3$ (Eltex B 2008) is calendered according to Example 3, pretreated, and pressed. The following values are determined:

| | | |
|---|---|---|
| surface tension after | 1 hour | 58 dyn/cm |
| | 3 weeks | 58 cyn/cm |
| | 3 months | 56 dyn/cm |
| not pretreated | 25 dyn/cm | |
| ability to retain its shape against heat | VSP/A 148° C. | |
| hardness | Shore D 67 | |
| longitudinal tensile strength | 26 N/mm$^2$ | |
| pulling strength in the peeling test | 2.6 kp/2.4 cm | |

EXAMPLE 5

A mixture of 80 parts by weight of PP according to Example 3 and 20 parts by weight of cellulose (Arbocel BÖ 600/50) and 20 parts by weight of calcium carbonate (Omya BSH) is calendered according to Example 3 and pretreated. The following results are determined:

| | | |
|---|---|---|
| surface tension after | 1 hour | 58 dyn/cm |
| | 3 weeks | 56 dyn/cm |
| | 3 months | 56 dyn/cym |
| not pretreated | 25 dyn/cm | |
| ability to retain its shape against heat | VSP/A 155° C. | |
| hardness | Shore D 72 | |
| longitudinal tensile strength | 35 N/mm$^2$ | |
| pulling strength in peeling test | 2.6 kp/2.4 cm | |

EXAMPLE 6

5 parts by weight of SBS block copolymer (Cariflex 1102) is added to 95 parts by weight of a mixture according to Example 3 and worked up according to Example 3. In calendering, it becomes evident that a good film can still be manufactured at a 20% higher speed.

The mechanical and adhesion properties measured are not disadvantageously influenced.

The film obtained is lacquered with a usual polyurethane lacquer (based on Desmophen 1340 and Desmodur H1).

In the adhesion test according to ASTM D.2.1.4.1-63, no separation of the lacquer layer takes place.

EXAMPLE 7

A mixture of 80 parts by weight of a PP copolymer according to Example 3 (K1 100), 20 parts by weight of cellulose (Arbocel B 600/50), 20 parts by weight of talc, and the usual additives is calendered into a 100 μm-thick film at 200° C., activated according to Example 1, and pressed onto a plywood sheet by means of a 50 μm-thick film from adhesion device KR 2683 at 130° C., 10 s and 10 $kp/cm^2$. Upon pulling the film layer from the plywood sheet, tearing of the plywood results.

EXAMPLE 8

A film according to Example 7 is pressed with an epoxy adhesive (Daubert International Co. 1 T DC 8160 BHV+1 T DC 8160 AHV) at room temperature and 5 $kp/cm^2$ for 24 hours. The film is torn in the pulling test.

We claim:

1. A polyolefin film having a resistance to heat of VSP/A above 100° C., said film consisting essentially of a random or block copolymer of polypropylene and either 1 to 10 mol % ethylene or 5 to 20 mol % polyethylene, and having adhesion properties that can be improved by surface activation, comprising a content of surface activating material consisting of fine particles of cellulose prepared according to the sulfide or sulfate process, which particles have a thickness of 10 to 30 μm and a length of from 5 to 100 μm, and a content of a mineral filler.

2. A film, as claimed in claim 1, wherein the cellulose content is from 3 to 30% by weight.

3. A film, as claimed in claim 2, comprising from about 3 to about 30 weight percent of mineral filler, based on the total weight of polyolefin and cellulose.

4. A film as claimed in claim 3 in which the mineral filler is calcium carbonate.

5. A film, as claimed in claim 1, wherein the surface is activated by radiation.

6. A film, as claimed in claim 1, further comprising a modifying agent.

7. In a process for the manufacture of a polyolefin film with improved adhesion properties wherein the film has a resistance to heat of VSP/A above 100° C., said film consisting essentially of a random or block copolymer of polypropylene and either 1 to 10 mol % ethylene or 5 to 20 mol % polyethylene and wherein the film is formed from a film mass and subjected to a surface-activation treatment, the improvement comprising adding, before forming the film, a content of a mineral filler and a surface activating material consisting of fine particles of cellulose prepared according to the sulfide or sulfate process, which particles have a thickness of 10 to 30 μm and a length of from 5 to 100 μm.

8. A process as claimed in claim 7 wherein 1 to 50% by weight of cellulose is added based on the sum of polyolefin and cellulose.

9. A process as claimed in claim 8, wherein 3 to 30% by weight of cellulose is added.

10. A process as claimed in claim 7 wherein the surface is activated by radiation.

11. A process as claimed in claim 7 wherein mica, talc, silicic acid, silicates or $TiO_2$ are added as mineral filler.

12. A process as claimed in claim 7 wherein the amount of mineral filler added is 1 to 50% by weight based on the total weight of polyolefin and cellulose.

13. A process as claimed in claim 7 further comprising adding a modifying agent to the foil mass before forming the foil.

14. A process as claimed in claim 13, wherein the modifying agent is based on styrene and elastomers.

15. A process as claimed in claim 7 wherein calcium carbonate is added as mineral filler.

* * * * *

UNITED STATES PATENT AND TRADEMARK OFFICE

CERTIFICATE OF CORRECTION

PATENT NO. : 4,751,141

DATED : June 14, 1988

INVENTOR(S) : Roland Fink

It is certified that error appears in the above-identified patent and that said Letters Patent is hereby corrected as shown below:

Cover Page, Item 30 Foreign Application Priority Data was omitted. Please insert --Jan. 17, 1980 [DE] Fed. Rep. of Germany 3001636--.

Signed and Sealed this

Fourth Day of April, 1989

Attest:

DONALD J. QUIGG

Attesting Officer

Commissioner of Patents and Trademarks